Figure 1:

No. 672,383. Patented Apr. 16, 1901.
C. W. LUTHER.
METHOD OF CONSTRUCTING LIGHT FIREPROOF BUILDING MATERIAL.
(Application filed Nov. 3, 1897.)
(No Model.) 2 Sheets—Sheet 1.

Witnesses. Inventor.
Christian W. Luther.
By James L. Norris.
Atty

THE NORRIS PETERS CO., PHOTO-LITHO., WASHINGTON, D. C.

No. 672,383. Patented Apr. 16, 1901.
C. W. LUTHER.
METHOD OF CONSTRUCTING LIGHT FIREPROOF BUILDING MATERIAL.
(Application filed Nov. 3, 1897.)
(No Model.) 2 Sheets—Sheet 2.
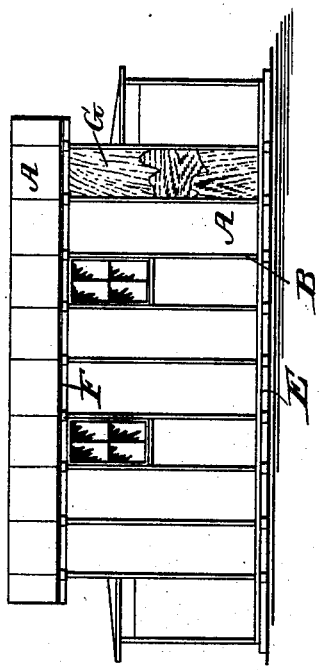
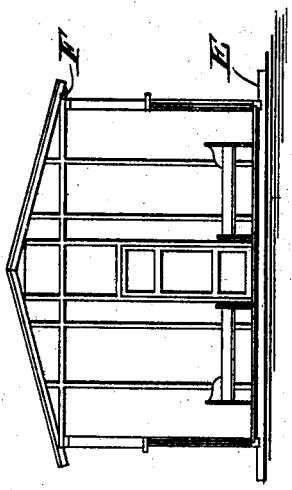
Witnesses.
Inventor:
Christian W. Luther.
By James L. Norris.
Atty.

UNITED STATES PATENT OFFICE.

CHRISTIAN WILHELM LUTHER, OF REVAL, RUSSIA.

METHOD OF CONSTRUCTING LIGHT FIREPROOF BUILDING MATERIAL.

SPECIFICATION forming part of Letters Patent No. 672,383, dated April 16, 1901.

Application filed November 3, 1897. Serial No. 657,271. (No model.)

*To all whom it may concern:*

Be it known that I, CHRISTIAN WILHELM LUTHER, a subject of the Czar of Russia, residing at Reval, Russia, have invented certain new and useful Improvements in Methods of Constructing Light Fireproof Building Material, (patented in Great Britain, No. 21,921, dated September 24, 1897,) of which the following is a specification.

For the erection of buildings which shall be practically fire and water proof I use a building material consisting of three or more sheets of veneer cemented together with a waterproof cement and coated on one or both sides with a paint having the ingredients and characteristics hereinafter specified.

The cement with which the gluing is done consists of a mixture of casein (eighty-five to sixty per cent.) or a substance similar to it, and slaked lime, fifteen to forty per cent., or any alkalic substance similar to it, and so much water that a cement is produced which may be easily laid on with a brush. To this cement materials insoluble in water, and which do not in any way influence the character of the cement may be added for cheapness. This cement after drying will be waterproof. Such veneer boards, composed of different layers of veneers cemented together with their fibers crossing, are much less combustible than ordinary boards. To make, however, these veneer boards still more water and fire proof, they may be covered outside with a composition consisting of a mixture of the above-described cement with an addition of coal-tar, (according to the effect that has to be produced, from five to thirty per cent. of tar to the dry cement.) This outer coating is indicated in the drawings by the thick line $a'$. The addition of the tar has a direct disinfecting influence due to the phenol (carbolic acid) contained in it; but it has also an indirect preserving effect by diminishing the adhesion of water (when raining) and therefore preventing the free lime of the cement being washed out. The tar further communicates to the painting, (cement and tar,) when thoroughly dry, a certain elasticity, because it slightly softens in a very hot sun, and therefore prevents the paint from cracking. On the other hand, the waterproof cement prevents the tar when exposed to a high temperature from getting sticky or running off. The lime in the cement prevents the material being attacked by insects.

Such boards as above described are fireproof to that degree that a soldering-flame of 1,000° to 1,200° Celsius directed to one side of a board of a thickness of about three-sixteenths of an inch will show itself on the other side of the board by this place being converted into charcoal after an elapse of more than five minutes without the board catching fire. The above-described boards are then nailed or screwed or riveted or fixed in some way to wooden or iron posts and rafters to form a building. To make it more fireproof, iron posts and rafters would be preferred. These might be chosen in any suitable shape. For instance, rolled ⊥-shaped girders could have the veneer boards or panels, prepared as aforesaid, secured in the flanges, or may be fitted to overlap at the ends, where rivets are passed through them.

For paneled ceilings of rooms and passages the panels of various kinds of woods would be very effective in appearance, besides being substantially fireproof.

To render my invention clearer, I have illustrated the construction of the material and certain applications thereof in the accompanying drawings, in which—

Figure 2:
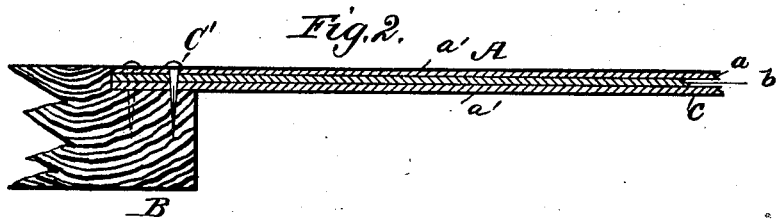
Figure 3:
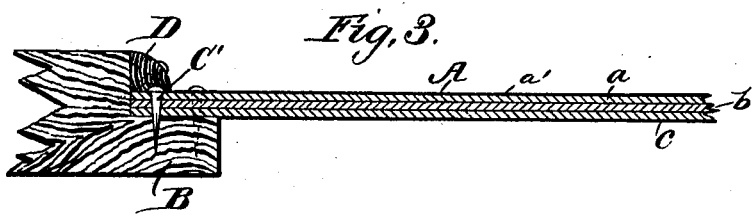
Figures 4, 5:
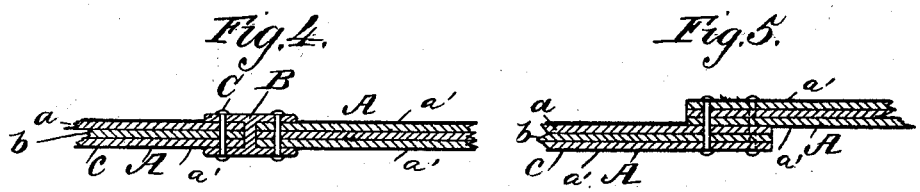

Figures 1 to 3 show sectional views through the improved material and various modes of securing the same to one upright. Fig. 4 is a similar view showing the material secured in an iron upright of special construction. Fig. 5 is a similar view showing the ends of the material lapped and secured together. Fig. 6 shows the interior of a temporary hospital, and Fig. 7 an elevation of the same.

In Fig. 1 the building material A, composed of the three sheets of veneer $a\ b\ c$, cemented together as described, is shown inserted in a groove in an upright B and secured therein by a bolt C. In Figs. 2 and 3 the material A is secured in a rabbet in the post B by nails C'. In Fig. 3 the rabbet is deeper than that shown in Fig. 2, and the material A is further secured by a bead D, which also affords an ornamental appearance. In Fig. 4 the post is of metal and H-shaped, the material A being secured between the flanges by bolts C. In Fig. 5 the ends of two pieces of the material A are shown overlapped and secured by bolts or rivets C, no post being needed. In Figs. 6 and 7 the material A is shown as extending from the base or flooring E to the eaves F, each slab or strip of material being secured in place by either of the methods shown in Figs. 1 to 5. The letter G at Fig. 7 indicates a panel of the material A, with a portion of two of the veneers or plies cut away to show the direction of the grain of the wood. The roof is or may be also composed of the veneer strips nailed to the rafters in any suitable manner.

What I claim, and desire to secure by Letters Patent, is—

As a new article of manufacture, a water and fire proof building material comprising a number of veneers cemented together with a waterproof cement, said material having applied to one or both sides a paint composed of casein, hydrate of lime, water and coal-tar, substantially as described.

In testimony whereof I have hereunto set my hand in presence of two subscribing witnesses.

CHRISTIAN WILHELM LUTHER.

Witnesses:
 OSCAR INGMAN,
 LUDWIG JABMENTZ.